US012684678B2

(12) United States Patent
Ukai

(10) Patent No.: US 12,684,678 B2
(45) Date of Patent: Jul. 14, 2026

(54) X-RAY FLUORESCENCE SPECTROMETER AND POWER SUPPLY APPARATUS

(71) Applicant: SHIMADZU CORPORATION, Kyoto (JP)

(72) Inventor: Yohei Ukai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 113 days.

(21) Appl. No.: 18/930,625

(22) Filed: Oct. 29, 2024

(65) Prior Publication Data

US 2025/0172515 A1 May 29, 2025

(30) Foreign Application Priority Data

Nov. 29, 2023 (JP) .................................. 2023-201306

(51) Int. Cl.
| | |
|---|---|
| *H05G 1/54* | (2006.01) |
| *G01N 23/223* | (2006.01) |
| *H05G 1/26* | (2006.01) |
| *H05G 1/32* | (2006.01) |
| *H05G 1/56* | (2006.01) |

(52) U.S. Cl.
CPC ............. *H05G 1/54* (2013.01); *G01N 23/223* (2013.01); *H05G 1/265* (2013.01); *H05G 1/32* (2013.01); *H05G 1/56* (2013.01)

(58) Field of Classification Search
CPC ............ H05G 1/54; H05G 1/265; H05G 1/32; H05G 1/56
See application file for complete search history.

(56) References Cited

U.S. PATENT DOCUMENTS

| | | | | |
|---|---|---|---|---|
| 4,654,770 A * | 3/1987 | Santurtun | ................ | H05G 1/34 |
| | | | | 363/56.03 |
| 2012/0294428 A1* | 11/2012 | Oketa | .................... | H02H 7/122 |
| | | | | 363/55 |
| 2015/0247811 A1* | 9/2015 | Yun | .................... | G01N 23/2076 |
| | | | | 378/45 |
| 2025/0031293 A1* | 1/2025 | Ukai | ........................ | H05G 1/10 |

FOREIGN PATENT DOCUMENTS

JP 2010-212072 A 9/2010

* cited by examiner

*Primary Examiner* — Chih-Cheng Kao
(74) *Attorney, Agent, or Firm* — Muir Patent Law, PLLC

(57) ABSTRACT

An X-ray fluorescence spectrometer includes a first power supply that applies a tube voltage and a second power supply that supplies a filament current. The first power supply includes a switching circuit connected to a primary side of a transformer. The X-ray fluorescence spectrometer includes a current detection circuit connected to the primary side of the transformer to detect a current that flows to the primary side of the transformer and a control circuit that controls the first power supply based on the detected current. The current detection circuit includes a first comparator configured to detect whether or not the current detected by the current detection circuit is equal to or larger than a first threshold value. The control circuit detects occurrence of electric discharge based on detection of the current equal to or larger than the first threshold value by the current detection circuit.

7 Claims, 7 Drawing Sheets

FIG.3

[FIRST EMBODIMENT]

600

CONTROL CIRCUIT

Figure 4:
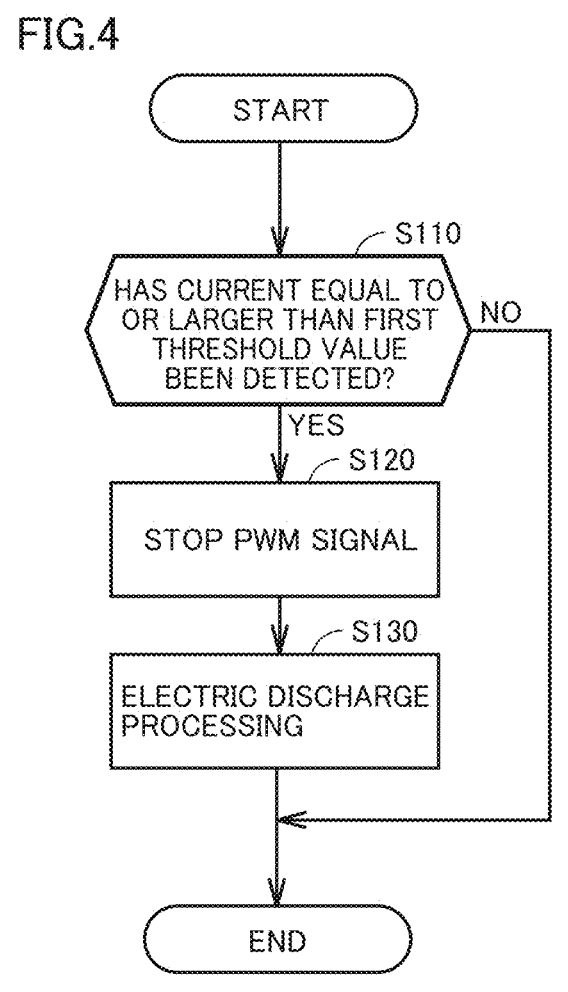

```
                    ┌─────────────┐
                    │    START    │
                    └──────┬──────┘
                           │
                           │        ┌─ S110
                           ▼
              ╱─────────────────────────╲
             ╱  HAS CURRENT EQUAL TO      ╲   NO
            ╱  OR LARGER THAN FIRST        ╲─────┐
            ╲     THRESHOLD VALUE          ╱     │
             ╲    BEEN DETECTED?          ╱      │
              ╲─────────────────────────╱        │
                           │ YES                 │
                           │      ┌─ S120        │
                           ▼                     │
                    ┌─────────────┐              │
                    │ STOP PWM    │              │
                    │  SIGNAL     │              │
                    └──────┬──────┘              │
                           │      ┌─ S130        │
                           ▼                     │
                    ┌──────────────┐             │
                    │ ELECTRIC     │             │
                    │ DISCHARGE    │             │
                    │ PROCESSING   │             │
                    └──────┬───────┘             │
                           │◄────────────────────┘
                           ▼
                    ┌─────────────┐
                    │     END     │
                    └─────────────┘
```

[SECOND EMBODIMENT]

600A

X-RAY FLUORESCENCE SPECTROMETER AND POWER SUPPLY APPARATUS

CROSS REFERENCE TO RELATED APPLICATIONS

This nonprovisional application is based on Japanese Patent Application No. 2023-201306 filed with the Japan Patent Office on Nov. 29, 2023, the entire contents of which are hereby incorporated by reference.

BACKGROUND OF THE INVENTION

Field of the Invention

The present disclosure relates to an X-ray fluorescence spectrometer and a power supply apparatus.

Description of the Background Art

An X-ray generator has conventionally been used in a method of analysis of a sample by irradiation of the sample with X-rays. Japanese Patent Laying-Open No. 2010-212072 (Patent Literature 1) discloses an X-ray generator that generates X-rays by application of a tube voltage to an X-ray tube where a cathode electrode and a target electrode are arranged. In the X-ray generator in Patent Literature 1, in application of a high voltage boosted by a high-voltage power supply unit to the X-ray tube, unintended electric discharge may occur, for example, in the X-ray tube or the like.

SUMMARY OF THE INVENTION

The high-voltage power supply unit of the X-ray generator in Patent Literature 1 includes a DCDC converter including a transformer that boosts a voltage. For protection of this high-voltage power supply unit against an overcurrent, an output side of the high-voltage power supply unit (a secondary side of the transformer) may be provided with a mechanism that detects an overcurrent at a level at which the high-voltage power supply unit fails. Such an overcurrent at the level at which the high-voltage power supply unit fails may be produced by short-circuiting in the high-voltage power supply unit, in the X-ray tube, or in a high-voltage cable that connects the high-voltage power supply unit and the X-ray tube to each other. A threshold value of the overcurrent detected by an overcurrent detection mechanism may be determined based on whether or not the overcurrent has a current value at a level at which X-rays produced by the overcurrent leak to the outside. The overcurrent detection mechanism determines whether or not the overcurrent has been produced based on a period of flow of the current, in addition to the current value.

In an X-ray fluorescence spectrometer, electric discharge at a level undetectable by the overcurrent detection mechanism may occur. Specifically, such electric discharge that one of magnitude of the current value and the period of flow of the current is smaller than the threshold value set for the overcurrent detection mechanism may occur. Similarly to the overcurrent to be detected by the overcurrent detection mechanism, a value of the current that flows to the high-voltage power supply unit due to electric discharge at the level undetectable by the overcurrent detection mechanism is larger than a value of the current that flows to the high-voltage power supply unit while there is no abnormality in the X-ray fluorescence spectrometer (in normal operation). The high-voltage power supply unit may be able to keep operating without failing even on the occurrence of such electric discharge at the level undetectable by an overcurrent detector. Intermittent occurrence of such electric discharge, however, may lead to deterioration of the high-voltage power supply unit and resultant failure.

In the overcurrent detection mechanism provided on the output side of the high-voltage power supply unit, in order to suppress transient increase in voltage, a capacitor may be arranged in parallel to a resistor for detection of the current. In detection of electric discharge with the overcurrent detection mechanism, however, parallel arrangement of the capacitor leads to lowering in response speed, and appropriate operation of the overcurrent detection mechanism as an electric discharge detection mechanism becomes difficult.

The present disclosure was made to solve the problems described above, and an object thereof is to accurately detect occurrence of electric discharge.

An X-ray fluorescence spectrometer according to one aspect of the present disclosure includes an X-ray tube including a filament and a target, the X-ray tube irradiating a sample with primary X-rays, a detector that detects secondary X-rays generated from the sample, a first power supply that applies a tube voltage to the target, and a second power supply that supplies a filament current to the filament. The first power supply includes a transformer and a switching circuit connected to a primary side of the transformer. The X-ray fluorescence spectrometer further includes a current detection circuit connected to the primary side of the transformer to detect a current that flows to the primary side of the transformer and a control circuit that controls the first power supply based on the current detected by the current detection circuit. The current detection circuit includes a first comparator configured to detect whether the current detected by the current detection circuit is equal to or larger than a first threshold value. The control circuit detects occurrence of electric discharge based on detection of the current equal to or larger than the first threshold value by the current detection circuit.

A power supply apparatus according to one aspect of the present disclosure is a power supply apparatus that supplies a current to an X-ray tube including a filament and a target, and the power supply apparatus includes a first power supply that applies a tube voltage to the target and a second power supply that supplies a filament current to the filament. The first power supply includes a transformer and a switching circuit connected to a primary side of the transformer. The power supply apparatus further includes a current detection circuit connected to the primary side of the transformer to detect a current that flows to the primary side of the transformer and a control circuit that controls the first power supply based on the current detected by the current detection circuit. The current detection circuit includes a first comparator configured to detect whether the current detected by the current detection circuit is equal to or larger than a first threshold value. The control circuit detects occurrence of electric discharge based on detection of the current equal to or larger than the first threshold value by the current detection circuit.

The foregoing and other objects, features, aspects and advantages of this invention will become more apparent from the following detailed description of this invention when taken in conjunction with the accompanying drawings.

BRIEF DESCRIPTION OF THE DRAWINGS

FIG. 3 is a diagram for illustrating an internal configuration of a current detection circuit in the first embodiment.

FIG. 4 is a flowchart for detection of electric discharge which is executed by a control circuit in the first embodiment.

DESCRIPTION OF THE PREFERRED EMBODIMENTS

First Embodiment

Figure 1:
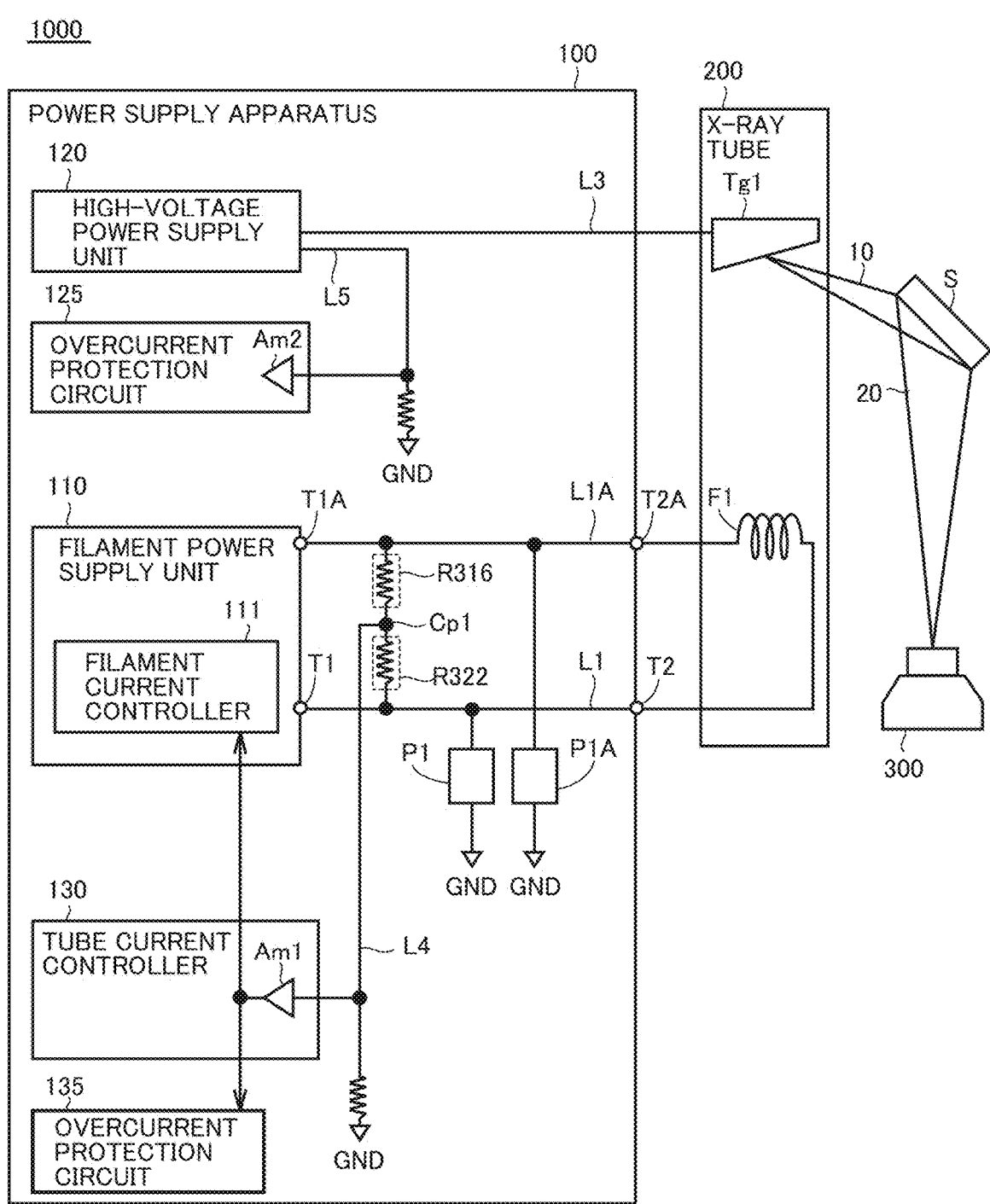
FIG. 1 is a diagram schematically showing a power supply apparatus and an X-ray tube of an X-ray fluorescence spectrometer.

The present embodiment will be described in detail with reference to the drawings. The same or corresponding elements in the drawings have the same reference characters allotted and description thereof will not be repeated in principle.
Configuration of Power Supply Apparatus and X-Ray Tube FIG. 1 is a diagram schematically showing a power supply apparatus 100 and an X-ray tube 200 of an X-ray fluorescence spectrometer 1000. X-ray fluorescence spectrometer 1000 is, for example, an energy dispersive X-ray fluorescence spectrometer (EDX). In the present embodiment, an example in which power supply apparatus 100 that generates primary X-rays is applied to X-ray fluorescence spectrometer 1000 will be described.

As shown in FIG. 1, X-ray fluorescence spectrometer 1000 includes power supply apparatus 100, X-ray tube, 200, and a detector 300. Power supply apparatus 100 applies a voltage to X-ray tube 200 to excite primary X-rays 10. A sample S is irradiated with primary X-rays 10. Sample S irradiated with primary X-rays 10 emits X-ray fluorescence 20. X-ray fluorescence 20 emitted from sample S is referred to as "secondary X-rays" in relation to primary X-rays. Detector 300 detects X-ray fluorescence 20. X-ray fluorescence spectrometer 1000 can thus conduct quantitative analysis or qualitative analysis of sample S.

A target Tg1 and a filament F1 are arranged in the inside of X-ray tube 200. Target Tg1 is an anode and filament F1 is a cathode. In X-ray tube 200, target Tg1 and filament F1 are arranged at a distance from each other. Power supply apparatus 100 includes a filament power supply unit 110, a high-voltage power supply unit 120, a tube current controller 130, and overcurrent protection circuits 125 and 135.

Filament power supply unit 110 supplies a current to filament F1 to heat filament F1. The current supplied to filament F1 by filament power supply unit 110 is referred to as a "filament current" below.

High-voltage power supply unit 120 applies a high voltage across target Tg1 and filament F1. The high voltage applied by high-voltage power supply unit 120 is referred to as a "tube voltage" below. High-voltage power supply unit 120 boosts with a rectifier, a converter, a Cockcroft-Walton circuit, or the like, a direct-current (DC) voltage converted from a commercial power supply by a switching power supply to generate the high voltage. High-voltage power supply unit 120 may correspond to the "first power supply"

in the present disclosure. Filament power supply unit 110 may correspond the "second power supply" in the present disclosure.

As shown in FIG. 1, high-voltage power supply unit 120 is connected to target Tg1 through a power line L3. In addition, high-voltage power supply unit 120 is connected to a ground terminal GND through a power line L5. In X-ray tube 200, thermions are generated by heating of filament F1 by filament power supply unit 110. Thermions impinge on target Tg1 by application of the tube voltage across filament F1 and target Tg1 by high-voltage power supply unit 120. Primary X-rays 10 are thus excited.

As shown in FIG. 1, filament power supply unit 110 is connected to filament F1 through a power line L1 and a power line L1A. Power line L1 is connected to one end of filament F1 and power line LIA is connected to the other end of filament F1. Filament power supply unit 110 has terminals T1 and T1A connected to power lines L1 and LIA, respectively. Power supply apparatus 100 has terminals T2 and T2A connected to filament F1.

A connection point Cp1 is a connection point between a connection point between terminal T1 and terminal T2 and a connection point between terminal T1A and terminal T2A. A resistor R322 is connected between connection point Cp1 and the connection point between terminal T1 and terminal T2. A resistor R316 is connected between connection point Cp1 and the connection point between terminal T1A and terminal T2A.

A power line L4 has one end connected to connection point Cp1 and has the other end connected to a ground terminal GND with a resistor being interposed. Power line L4 may have one end connected to any one of the connection point between terminal T1 and terminal T2 and the connection point between terminal T1A and terminal T2A, rather than connection point Cp1.

In power line L1, a protection circuit P1 including a Zener diode is connected between terminal T1 and terminal T2. Similarly, in power line LA, a protection circuit P1A including a Zener diode is connected between terminal T1A and terminal T2A. Protection circuits P1 and PIA are circuits that protect filament power supply unit 110 and tube current controller 130 against electric discharge that occurs in X-ray tube 200.

Tube current controller 130 carries out feedback control to adjust output from filament power supply unit 110 based on a current value of the current that flows through power line L4. More specifically, tube current controller 130 detects a value of the tube current that flows through power line L4 by converting with the resistor, the tube current that flows through power line L4 into a voltage value and amplifying the voltage value with an amplifier Am1. Tube current controller 130 transmits the value of the detected tube current to a filament current controller 111 and overcurrent protection circuit 135.

Filament power supply unit 110 adjusts a filament current to be outputted, based on the value of the tube current detected by tube current controller 130. Overcurrent protection circuit 135 detects whether or not the value of the current detected by tube current controller 130 indicates an overcurrent. Specifically, overcurrent protection circuit 135 is configured to stop output from high-voltage power supply unit 120 when the current detected by tube current controller 130 deviates by a prescribed value from a desired value of the tube current.

Similarly, overcurrent protection circuit 125 arranged on the output side of high-voltage power supply unit 120 detects the current that flows through power line L5 by converting with the resistor, the current that flows through power line L5 into a voltage value and amplifying the voltage value with an amplifier Am2. Overcurrent protection circuit 125 is a circuit that protects high-voltage power supply unit 120 against the overcurrent by stopping output from high-voltage power supply unit 120 when it detects continued flow of the overcurrent for a certain period.

Thus, in X-ray fluorescence spectrometer 1000 in the present embodiment, when overcurrent protection circuits 125 and 135 arranged on the output side of high-voltage power supply unit 120 detect the overcurrent, output from high-voltage power supply unit 120 is stopped. In other words, in X-ray fluorescence spectrometer 1000 in the present embodiment, upon detection of the overcurrent, operation of high-voltage power supply unit 120 is stopped to protect high-voltage power supply unit 120, the resistors connected to power lines L3 and LA, resistors R316 and R322, and the like against the overcurrent.

The overcurrent having the current value at the level at which high-voltage power supply unit 120 fails may be produced by occurrence of short-circuiting in high-voltage power supply unit 120, in X-ray tube 200, in power line L3 that connects high-voltage power supply unit 120 and X-ray tube 200 to each other, or the like. The overcurrent detection mechanism determines whether or not the overcurrent is produced based on both of magnitude of the current value and a period of flow of the current. Occurrence of such electric discharge that one of magnitude of the current value and the period of flow of the current is smaller than a threshold value set for the overcurrent detection mechanism, however, leads to occurrence of electric discharge at the level undetectable by the overcurrent detection mechanism. Such electric discharge is undetectable by the overcurrent detection mechanism, whereas it is larger than the value of the current that flows in normal operation where there is no abnormality in X-ray fluorescence spectrometer 1000.

High-voltage power supply unit 120 may be able to operate without failing even on the occurrence of such electric discharge. Intermittent occurrence of electric discharge a plurality of times, however, may lead to deterioration or failure of high-voltage power supply unit 120. In addition, reliability of data detected by detector 300 while electric discharge intermittently occurs is lower than reliability of data detected while electric discharge is not occurring.

In overcurrent protection circuit 125 provided on the output side of high-voltage power supply unit 120, in order to suppress transient increase in voltage, a capacitor may be arranged in parallel to a resistor for detection of the current. In detection of electric discharge with overcurrent protection circuit 125, however, parallel arrangement of the capacitor leads to lowering in response speed, and appropriate operation of overcurrent protection circuit 125 as an electric discharge detection mechanism becomes difficult. Even if a method of suppressing transient increase in voltage while increasing the response speed of overcurrent protection circuit 125 is adopted, the higher response speed of overcurrent protection circuit 125 raises possibility of a malfunction of overcurrent protection circuit 125 and increases cost for manufacturing of power supply apparatus 100.

Occurrence of electric discharge in X-ray tube 200 or the like leads to lowering in voltage on power line L3 on the output side of high-voltage power supply unit 120. Therefore, in the present embodiment, an output voltage monitor or a differential circuit that detects the output voltage from high-voltage power supply unit 120 may newly be provided on the output side of high-voltage power supply unit 120 to detect lowering in voltage to thereby detect electric discharge. X-ray fluorescence spectrometer 1000 can thus detect electric discharge without overcurrent protection circuits 125 and 135.

In an example where the output voltage monitor is newly provided on the output side of high-voltage power supply unit 120, however, an AD converter high in sampling rate should be provided, which increases cost for manufacturing of power supply apparatus 100. In an example where the differential circuit is provided, a capacitor with a high withstand voltage should be provided in the differential circuit, which leads to increase in cost for manufacturing of power supply apparatus 100, as in the example where the output voltage monitor is provided. Since the capacitor with the high withstand voltage required in the example where the differential circuit is provided is provided on the output side of high-voltage power supply unit 120, power supply apparatus 100 increases in size.

Then, in X-ray fluorescence spectrometer 1000 in the present embodiment, a current detection circuit that detects a current in a boost DCDC converter inside high-voltage power supply unit 120 and is included in high-voltage power supply unit 120 is used to detect electric discharge that produces a current greater than the value of the current that flows in high-voltage power supply unit 120 while there is no abnormality in X-ray fluorescence spectrometer 1000. The DCDC converter and the current detection circuit in the first embodiment will be described below with reference to FIGS. 2 and 3.

Figure 2:
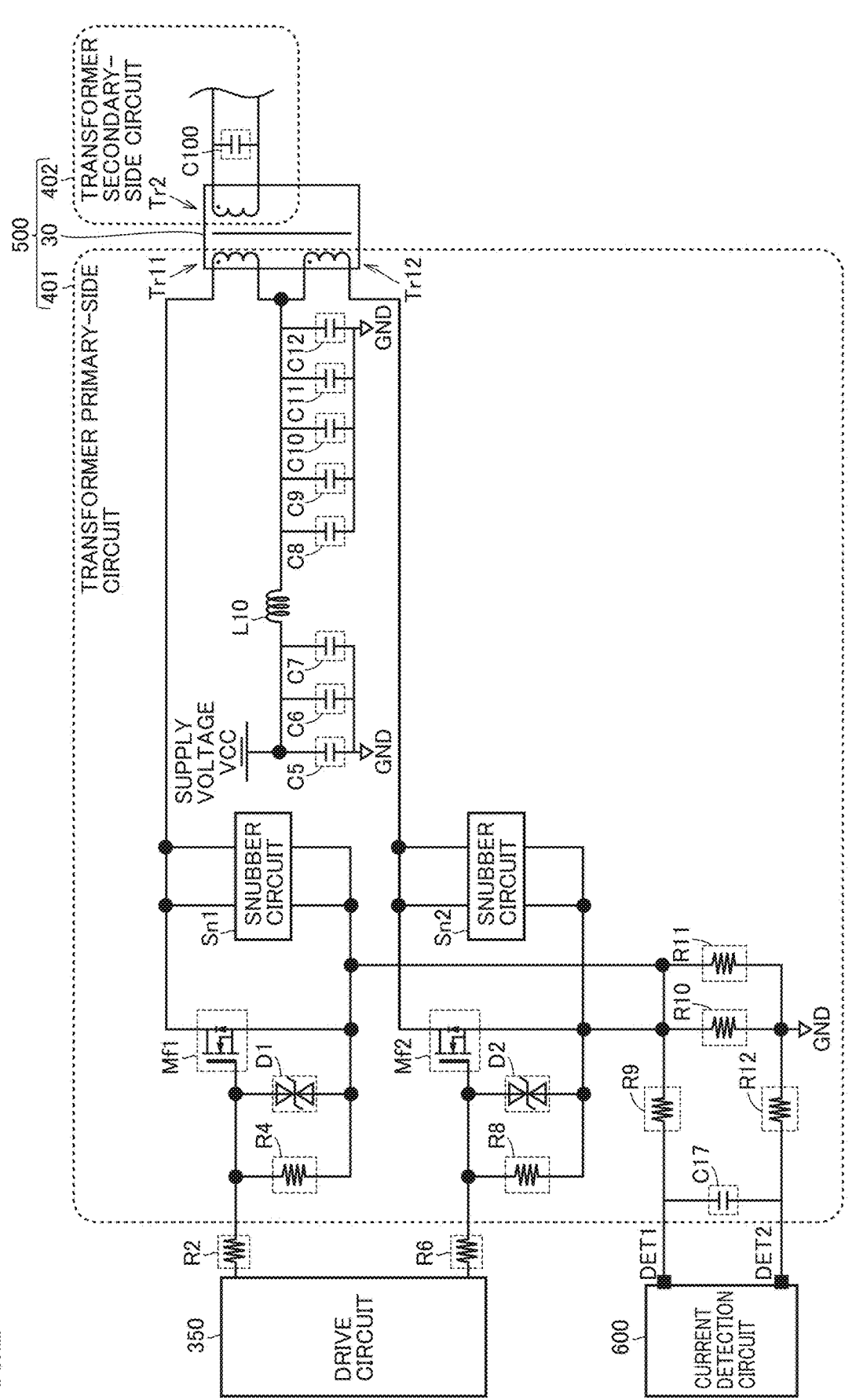
FIG. 2 is a diagram for illustrating an internal configuration of a boost DCDC converter 500 arranged in a high-voltage power supply unit in a first embodiment.

FIG. 2 is a diagram for illustrating an internal configuration of a boost DCDC converter 500 arranged in high-voltage power supply unit 120 in the first embodiment. High-voltage power supply unit 120 in FIG. 1 includes DCDC converter 500 shown in FIG. 2. Power supply apparatus 100 in FIG. 1 includes a drive circuit 350 shown in FIG. 2 and a current detection circuit 600 that detects a current in a transformer primary-side circuit. DCDC converter 500 in the first embodiment is a DCDC converter, and more specifically a push-pull converter.

As shown in FIG. 2, DCDC converter 500 includes a transformer 30, a transformer primary-side circuit 401, and a transformer secondary-side circuit 402. Transformer 30 includes primary windings Tr11 and Tr12 included in transformer primary-side circuit 401 and a secondary winding Tr2 included in transformer secondary-side circuit 402. Transformer 30 may correspond to the "transformer" in the present disclosure.

DCDC converter 500 boosts a DC voltage of 24 V applied from a supply voltage VCC as switching elements Mf1 and Mf2 are driven. The DC voltage applied from supply voltage VCC is generated by rectification or the like of the commercial power supply. The DC voltage applied from supply voltage VCC may be a voltage other than 24 V. The voltage boosted by DCDC converter 500 is further boosted to an output voltage from high-voltage power supply unit 120 by the Cockcroft-Walton circuit or the like. The output voltage from high-voltage power supply unit 120 is, for example, 60 kV.

As shown in FIG. 2, supply voltage VCC is connected to each of primary windings Tr11 and Tr12 in transformer primary-side circuit 401. An inductor L10 is connected between supply voltage VCC and primary windings Tr11 and Tr12. Capacitors C5, C6, and C7 are connected in parallel between one end of inductor L10 and ground terminal GND. Capacitors C8 to C12 are connected in parallel between the other end of inductor L10 and ground terminal GND. Capacitors C5 to C12 function as bypass capacitors that remove an alternating-current (AC) component. In one aspect, capacitors C5 to C7 may be implemented by capacitors in number other than three, and may be implemented, for example, by a single capacitor. Similarly, capacitors C8 to C12 may be implemented by capacitors in number other than five, and may be implemented, for example, by a single capacitor.

As shown in FIG. 2, primary winding Tr11 has one end connected to inductor L10. Primary winding Tr11 has the other end connected to a drain terminal of switching element Mf1. In the first embodiment, switching element Mf1 is, for example, a metal oxide semiconductor field effect transistor (MOSFET), which is an element that switches supply of the current to primary winding Tr11. A snubber circuit Sn1 is connected between the drain terminal of switching element Mf1 and a source terminal of switching element Mf1. Snubber circuit Sn1 is a protection circuit that suppresses a transient high voltage generated at the time of disconnection of a switch in switching element Mf1.

Switching element Mf1 has a gate terminal connected to drive circuit 350 with a resistor R2 being interposed. Drive circuit 350 controls switching element Mf1 under pulse width modulation (PWM) control. A resistor R4 and a bidirectional Zener diode D1 are connected in parallel between the gate terminal of switching element Mf1 and the source terminal of switching element Mf1. Bidirectional Zener diode D1 is provided to protect switching element Mf1 at the time of production of an overvoltage at the gate terminal of switching element Mf1.

A circuit connected to primary winding Tr12 will also similarly be described. Primary winding Tr12 has one end connected to inductor L10 and has the other end connected to switching element Mf2. Likewise switching element Mf1, switching element Mf2 is, for example, a MOSFET. A snubber circuit Sn2 is connected between a drain terminal of switching element Mf2 and a source terminal of switching element Mf2. Snubber circuit Sn2 is a protection circuit that suppresses a transient high voltage generated at the time of disconnection of a switch in switching element Mf2.

Switching element Mf2 has a gate terminal connected to drive circuit 350 with a resistor R6 being interposed. Drive circuit 350 controls switching element Mf2 under PWM control. A resistor R8 and a bidirectional Zener diode D2 are connected in parallel between the gate terminal of switching element Mf2 and the source terminal of switching element Mf2. Bidirectional Zener diode D2 is provided to protect switching element Mf2 at the time of production of an overvoltage at the gate terminal of switching element Mf2.

Drive circuit 350 has an on state and an off state of switching element Mf1 repeated and has the on state and the off state of switching element Mf2 repeated to alternately supply the current to primary winding Tr11 and primary winding Tr12. Drive circuit 350 controls switching elements Mf1 and Mf2 so as to prevent switching elements Mf1 and Mf2 from being simultaneously set to the on state. In one aspect, switching elements Mf1 and Mf2 may each be an insulated gate bipolar transistor (IGBT) rather than the MOSFET. Each of switching elements Mf1 and Mf2 may correspond to the "switching circuit" in the present disclosure.

Current detection circuit 600 will then be described. As shown in FIG. 2, resistors R11 and R10 have one ends connected to the source terminals of switching elements Mf1 and Mf2, respectively. Resistors R10 and R11 have the other ends connected to ground terminal GND. Resistors R10 and R11 have one ends connected to a terminal DET1 of current detection circuit 600 with a resistor R9 being interposed, and have the other ends connected to a terminal DET2 with a resistor R12 being interposed.

Since voltages across opposing ends of resistor R10 and resistor R11 are connected to current detection circuit 600, current detection circuit 600 can detect the value of the current that flows through switching element Mf1 or switching element Mf2 for each pulse of switching. As shown in FIG. 2, a capacitor C17 is connected between resistor R9 and resistor R12. Capacitor C17 is arranged for the purpose of removal of noise in an AC component.

As shown in FIG. 2, in transformer secondary-side circuit 402 connected to target Tg1, a capacitor C100 is connected to secondary winding Tr2. Capacitor C100 is, for example, a smoothing capacitor or a capacitor included in a Cockcroft-Walton circuit. In the present embodiment, on the occurrence of electric discharge in X-ray tube 200 or the like, the electric discharge causes lowering in output voltage from high-voltage power supply unit 120. Accordingly, high-voltage power supply unit 120 increases the lowered output voltage under feedback control. At this time, capacitor C100 in transformer secondary-side circuit 402 should be charged.

In order to charge capacitor C100, a current greater than the current that flows while such abnormality as electric discharge is not occurring and the tube voltage is applied flows through switching element Mf1 or switching element Mf2. In order to suppress flow of the great current through switching elements Mf1 and Mf2 for charging of capacitor C100, current detection circuit 600 detects with a comparator which will be described later, generation of the current greater than the current value in normal operation where such abnormality as electric discharge is not occurring, and temporarily stops operation of high-voltage power supply unit 120.

Current detection circuit 600 in the inside of high-voltage power supply 120 is a circuit that detects whether or not the current greater than the current value in normal operation where abnormality is not occurring flows through switching element Mf1 or Mf2. In the present embodiment, this current detection circuit 600 is used for detection of electric discharge.

Figure 3:
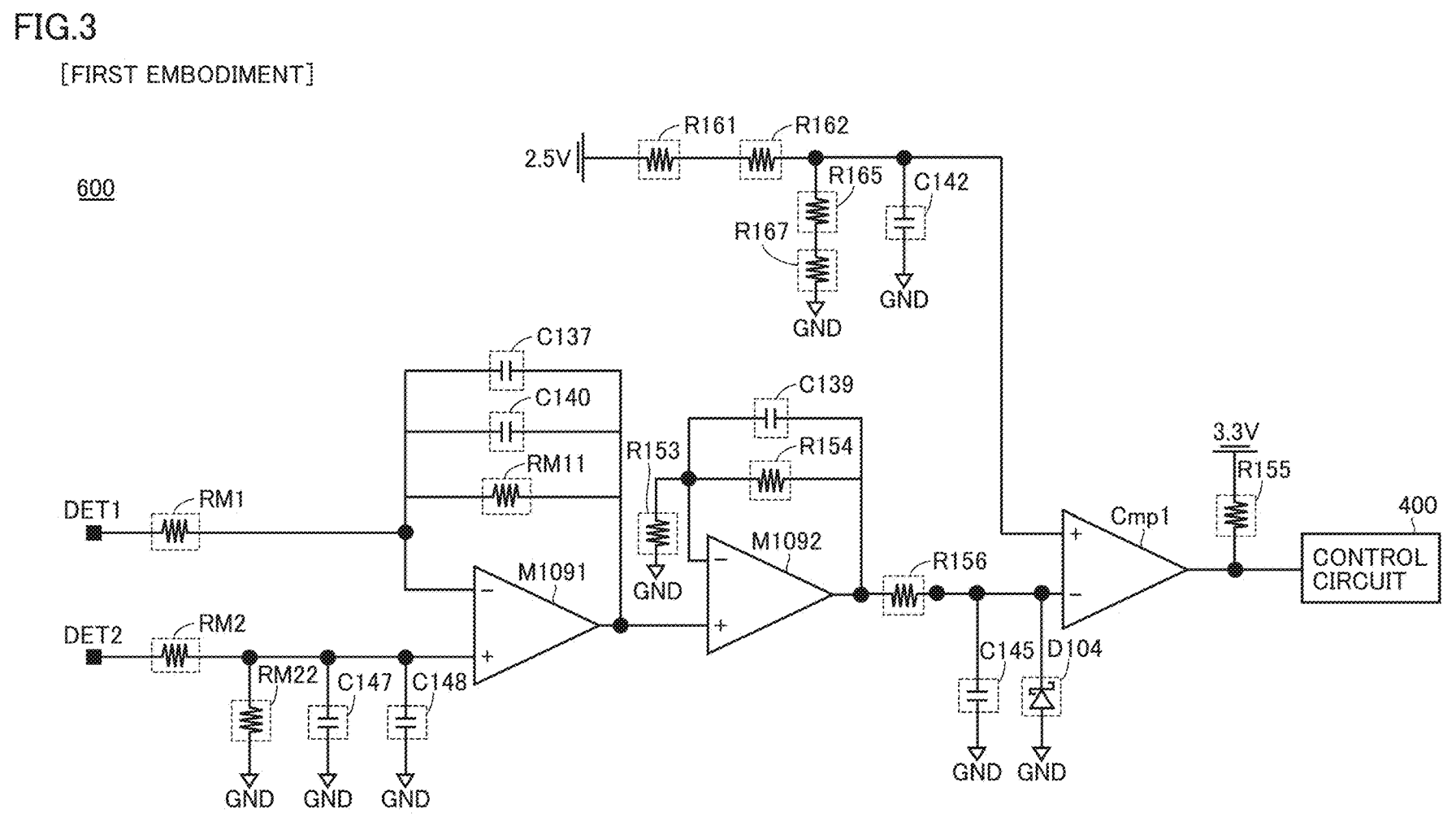

FIG. 3 is a diagram for illustrating an internal configuration of current detection circuit 600 in the first embodiment. Current detection circuit 600 in the first embodiment amplifies with an amplifier, a voltage value obtained by conversion of the detected current with the resistor. A comparator Cmp1 is a comparator for determination as to whether or not the value of the current detected by current detection circuit 600 is equal to or larger than a first threshold value. In other words, comparator Cmp1 obtains a value of the voltage amplified by operational amplifiers M1091 and M1092 and transmits an output result indicating whether or not the value of the current detected by current detection circuit 600 is equal to or larger than the first threshold value to a control circuit 400. The first threshold value is set, for example, to 30 A. The first threshold value may be set to another current value so long as electric discharge can be detected based thereon, and it may be set, for example, to 28 A or 32 A. Though current detection circuit 600 in the first embodiment includes operational amplifiers M1091 and M1092 in two stages and comparator Cmp1, in one aspect, current detection circuit 600 may include an operational amplifier in one stage rather than the two stages or it does not have to be provided with an operational amplifier itself. Comparator Cmp1 may correspond to the "first comparator" in the present disclosure.

As shown in FIG. 3, terminal DET1 is connected to an inverting input terminal of operational amplifier M1091 with a resistor RM1 being interposed. Terminal DET2 is connected to a non-inverting input terminal of operational amplifier M1091 with a resistor RM2 being interposed. A capacitor C148, a capacitor C147, and one end of a resistor RM22 are connected between resistor RM2 and the non-inverting input terminal of operational amplifier M1091. Ground terminal GND is connected to capacitors C147 and C148 and the other end of resistor RM22. Capacitors C147 and C148 function as bypass capacitors.

Furthermore, as shown in FIG. 3, a capacitor C137, a capacitor C140, and a resistor RM11 are connected in parallel between an output terminal of operational amplifier M1091 and the inverting input terminal of operational amplifier M1091. Capacitor C137 and capacitor C140 are arranged for the purpose of removal of high-frequency noise.

As shown in FIG. 3, operational amplifier M1091 has the output terminal connected to a non-inverting input terminal of operational amplifier M1092. Operational amplifier M1092 has an inverting input terminal connected to ground terminal GND with a resistor R153 being interposed. As shown in FIG. 3, a capacitor C139 and a resistor R154 are connected in parallel between an output terminal of operational amplifier M1092 and the inverting input terminal of operational amplifier M1092. Capacitor C139 is arranged for the purpose of removal of high-frequency noise, similarly to capacitor C137 and capacitor C140. Thus, in the first embodiment, the detected current is amplified by operational amplifiers M1091 and M1092 in two stages.

Operational amplifier M1092 has the output terminal connected to an inverting input terminal of comparator Cmp1 with a resistor R156 being interposed. One end of a capacitor C145 and a cathode of a Zener diode D104 are connected between resistor R156 and the inverting input terminal of comparator Cmp1. Ground terminal GND is connected to each of the other end of capacitor C145 and an anode of Zener diode D104.

Comparator Cmp1 has a non-inverting input terminal connected to a supply voltage of 2.5 V with resistors R161 and R162 being interposed. The first threshold value varies with the value of supply voltage of 2.5 V, resistance values of resistors R161, R162, R165, and R167, and the like. One end of a capacitor C142 and one end of resistor R165 are connected between resistor R162 and the non-inverting input terminal of comparator Cmp1. Resistor R165 has the other end connected to ground terminal GND with resistor R167 being interposed. Capacitor C142 has the other end connected to ground terminal GND. Capacitor C142 functions as a bypass capacitor.

Comparator Cmp1 has an output terminal connected to a supply voltage of 3.3 V with a resistor R155 being interposed. When the current detected by current detection circuit 600 is equal to or larger than the first threshold value, comparator Cmp1 outputs the Low level from the output terminal. When the value of the current detected by current detection circuit 600 is smaller than the first threshold value, on the other hand, comparator Cmp1 outputs the High level from the output terminal. Control circuit 400 is a circuit that accepts an output result from comparator Cmp1 and performs processing in accordance with the accepted output result.

In the first embodiment, control circuit 400 is implemented by a programmable logic device (PLD). In one aspect, control circuit 400 may be implemented by a processor such as a central processing unit (CPU), a microprocessing unit (MPU), a graphics processing unit (GPU), or the like. Though such a processor performs functions to perform various types of processing by executing a program, some or all of the functions of the processor may be performed by a field programmable gate array (FPGA), an application specific integrated circuit (ASIC), or the like.

The term "processor" is not limited to a processor in a narrow sense that performs processing in accordance with a stored program architecture like the CPU or the MPU, but may encompass hard-wired circuitry such as the ASIC or the FPGA. Therefore, the processor can also be read as processing circuitry, processing by which is defined in advance by a computer readable code and/or hard-wired circuitry. The processor may be implemented by a single chip or a plurality of chips.

Furthermore, the processor and relating processing circuitry may be implemented by a plurality of computers connected to one another through wires or wirelessly over a local area network or a wireless network. The processor and the relating processing circuitry may be implemented by a cloud computer that performs remote computation based on input data and outputs a result of computation to another device located at a remote position.

FIG. 4 is a flowchart for detection of electric discharge which is executed by control circuit 400 in the first embodiment. Control circuit 400 repeats execution of the flowchart in FIG. 4 for a period during which high-voltage power supply unit 120 is driven.

Control circuit 400 determines whether or not the current equal to or larger than the first threshold value has been detected based on the output result from comparator Cmp1 (step S110). When the current equal to or larger than the first threshold value has not been detected (NO in step S110), control circuit 400 quits the process. When the current equal to or larger than the first threshold value has been detected (YES in step S110), on the other hand, control circuit 400 stops application of a PWM signal by drive circuit 350 (step S120). Output from high-voltage power supply unit 120 is thus stopped.

Thereafter, control circuit 400 performs electric discharge processing (step S130). The electric discharge processing in the first embodiment refers to processing performed upon detection of generation of the current greater than in normal operation including electric discharge. Specifically, in step S130, control circuit 400 notifies a user of generation of the current greater than in normal operation including electric discharge. Control circuit 400 notifies the user of occurrence of electric discharge, for example, through a display, a speaker, a transmitter, or the like provided in X-ray fluorescence spectrometer 1000. The electric discharge processing may be processing for storing time and date of generation of the current greater than in normal operation including electric discharge, rather than notifying the user of generation of the current greater than in normal operation including electric discharge.

Thus, in the first embodiment, current detection circuit 600 included in high-voltage power supply unit 120 can be used to accurately detect electric discharge. Power supply apparatus 100 in the first embodiment stops operation of high-voltage power supply unit 120 upon detection of electric discharge.

Second Embodiment

In the first embodiment, the configuration in which current detection circuit 600 includes one comparator Cmp1 is described. In the first embodiment, the electric discharge processing is performed upon detection of the current equal to or larger than the first threshold value (30 A). In the first embodiment, however, electric discharge less than the first threshold value (30 A) cannot be detected.

In a second embodiment, X-ray fluorescence spectrometer 1000 configured to more readily detect electric discharge at a level at which high-voltage power supply unit 120 does not fail will be described. Description of features the same as those in X-ray fluorescence spectrometer 1000 in the first embodiment will not be repeated in the second embodiment.

Figure 5:
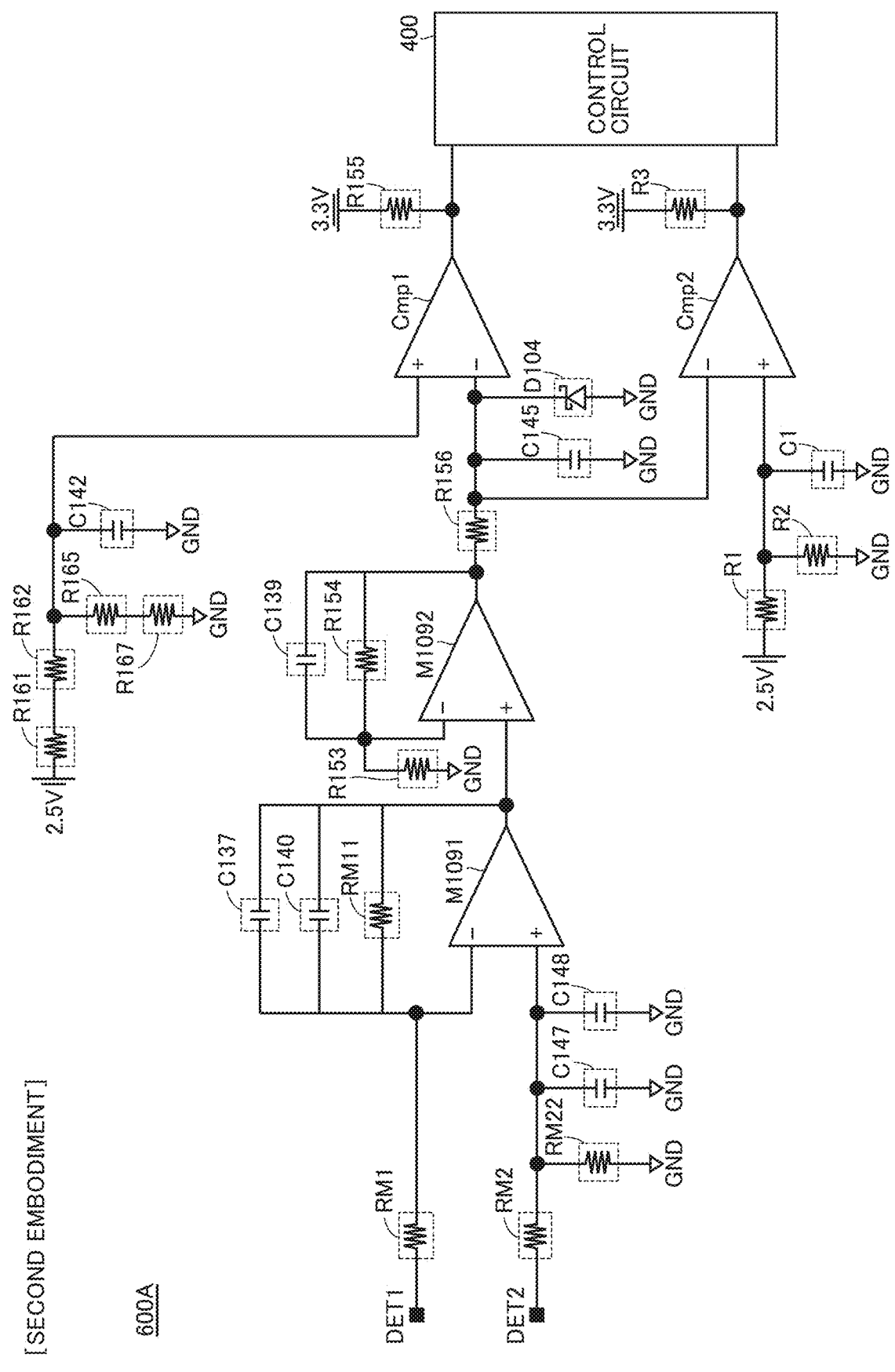
FIG. 5 is a diagram for illustrating an internal configuration of a current detection circuit in a second embodiment.

FIG. 5 is a diagram for illustrating an internal configuration of a current detection circuit 600A in the second embodiment. As shown in FIG. 5, current detection circuit 600A in the second embodiment includes a comparator Cmp2 in addition to comparator Cmp1. In the second embodiment, operational amplifier M1092 has the output terminal connected to the inverting input terminal of comparator Cmp1 and an inverting input terminal of comparator Cmp2 with resistor R156 being interposed. Comparator Cmp2 may correspond to the "second comparator" in the present disclosure.

Likewise comparator Cmp1, comparator Cmp2 obtains a value of the voltage amplified by operational amplifiers M1091 and M1092 and transmits to control circuit 400, an output result indicating whether or not the value of the current detected by current detection circuit 600 is equal to or larger than a second threshold value. Comparator Cmp2 has a non-inverting input terminal connected to the supply voltage of 2.5 V with a resistor R1 being interposed. A voltage value at the non-inverting input terminal of comparator Cmp1 and a voltage value at the non-inverting input terminal of comparator Cmp2 are different from each other. In other words, the first threshold value which is a reference for comparison by comparator Cmp1 and the second threshold value which is a reference for comparison by comparator Cmp2 are different from each other. The second threshold value is smaller than the first threshold value, and set, for example, to 25 A. The second threshold value is a threshold value directed to detection of electric discharge in which a relatively small current value is produced. In other words, comparator Cmp2 is a comparator capable of detecting electric discharge further smaller in current value than electric discharge detectable in the first embodiment.

As shown in FIG. 5, one end of a capacitor C1 and one end of resistor R2 are connected between resistor R1 and the non-inverting input terminal of comparator Cmp2. Capacitor C1 and resistor R2 have the other ends connected to ground terminal GND. Capacitor C1 functions as a bypass capacitor.

Comparator Cmp2 has an output terminal connected to the supply voltage of 3.3 V with a resistor R3 being interposed. When the value of the current detected by current detection circuit 600A is equal to or larger than the second threshold value, comparator Cmp2 outputs the Low level from the output terminal. Comparator Cmp2 is configured to output the High level when the value of the current detected by current detection circuit 600A is smaller than the second threshold value. Control circuit 400 accepts an output result from comparator Cmp2 and performs processing in accordance with the accepted output result.

Figure 6:
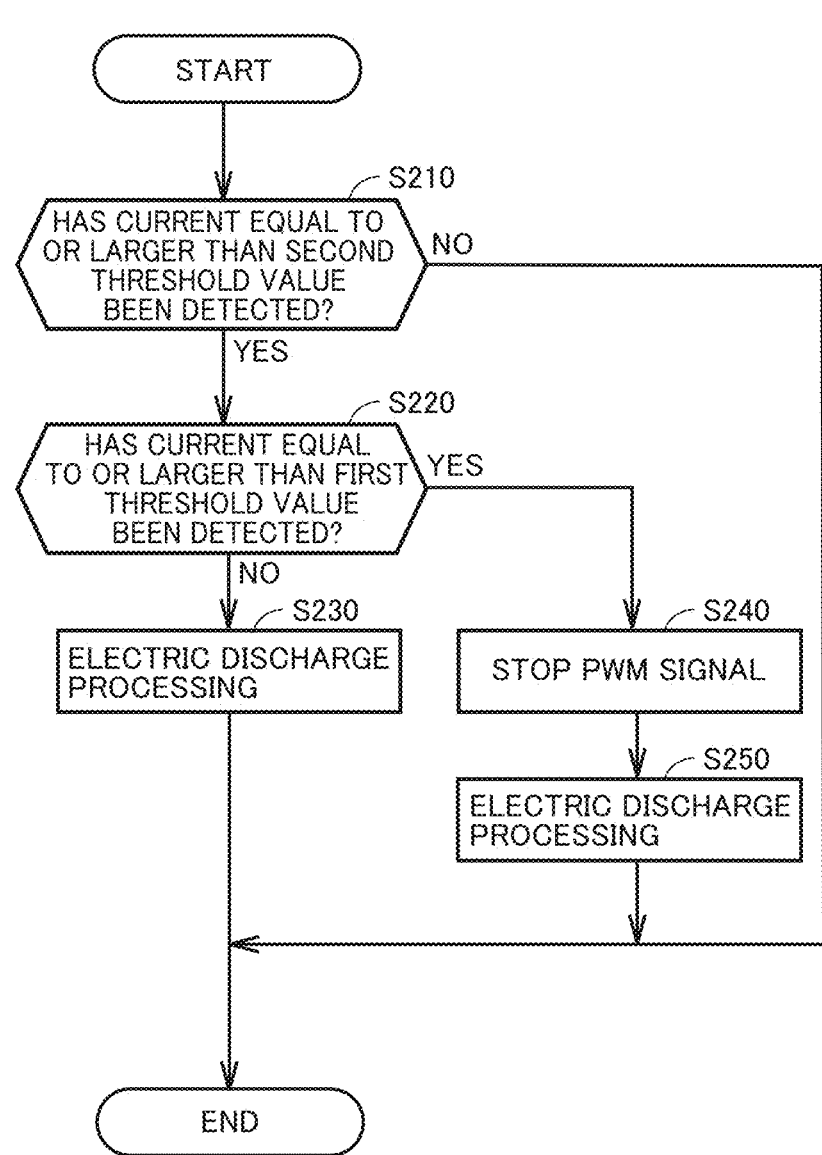
FIG. 6 is a flowchart for detection of electric discharge which is executed by the control circuit in the second embodiment.

FIG. 6 is a flowchart for detection of electric discharge which is executed by control circuit 400 in the second embodiment. Control circuit 400 in the second embodiment repeats execution of the flowchart in FIG. 6 for a period during which high-voltage power supply unit 120 is driven.

Control circuit 400 determines whether or not the current equal to or larger than the second threshold value has been detected based on the output result from comparator Cmp2 (step S210). When the current equal to or larger than the second threshold value has not been detected (NO in step S210), control circuit 400 quits the process.

When the current equal to or larger than the second threshold value has been detected (YES in step S210), control circuit 400 determines whether or not the current equal to or larger than the first threshold value has been detected based on the output result from comparator Cmp1 (step S220). When the current equal to or larger than the first threshold value has not been detected in step S220 (NO in step S220), control circuit 400 performs the electric discharge processing (step S230). Though the electric discharge processing refers to the processing for notifying the user of occurrence of electric discharge also in the second embodiment as in the first embodiment, it may be processing for storing time and date of occurrence of electric discharge in X-ray tube 200 or the like, rather than notifying the user of occurrence of electric discharge.

Referring back to step S220, when the current equal to or larger than the first threshold value has been detected (YES in step S220), control circuit 400 has drive circuit 350 stop application of the PWM signal (step S240). Thereafter, control circuit 400 performs the electric discharge processing (step S250).

Thus, in the second embodiment, the overcurrent at the level at which high-voltage power supply unit 120 fails and electric discharge where the current is relatively low can be detected as being distinguished from each other. Thus, only when possibility of production of the overcurrent at the level at which high-voltage power supply unit 120 fails is high, application of the PWM signal can be stopped. Current detection circuit 600 included in high-voltage power supply unit 120 can be used to detect electric discharge also in the second embodiment as in the first embodiment. In other words, X-ray fluorescence spectrometer 1000 in the second embodiment can also accurately detect occurrence of electric discharge.

As described above, when electric discharge occurs, the voltage on the output side of high-voltage power supply unit 120 lowers. With lowering in voltage on the output side, control circuit 400 increases the lowered output voltage under feedback control. At this time, capacitor C100 is charged and a great current temporarily flows through transformer primary-side circuit 401. Even when the user changes a setting value of the output voltage from high-voltage power supply unit 120, however, a great current temporarily flows to transformer primary-side circuit 401 for charging again of capacitor C100.

Specifically, when the user changes the setting value of the output voltage from high-voltage power supply unit 120, control circuit 400 may erroneously detect occurrence of electric discharge. Then, in the second embodiment, erroneous detection of electric discharge is suppressed by execution of a flowchart below by control circuit 400 not to determine that electric discharge has occurred at the time of change of the setting value of the output voltage from high-voltage power supply unit 120.

Figure 7:
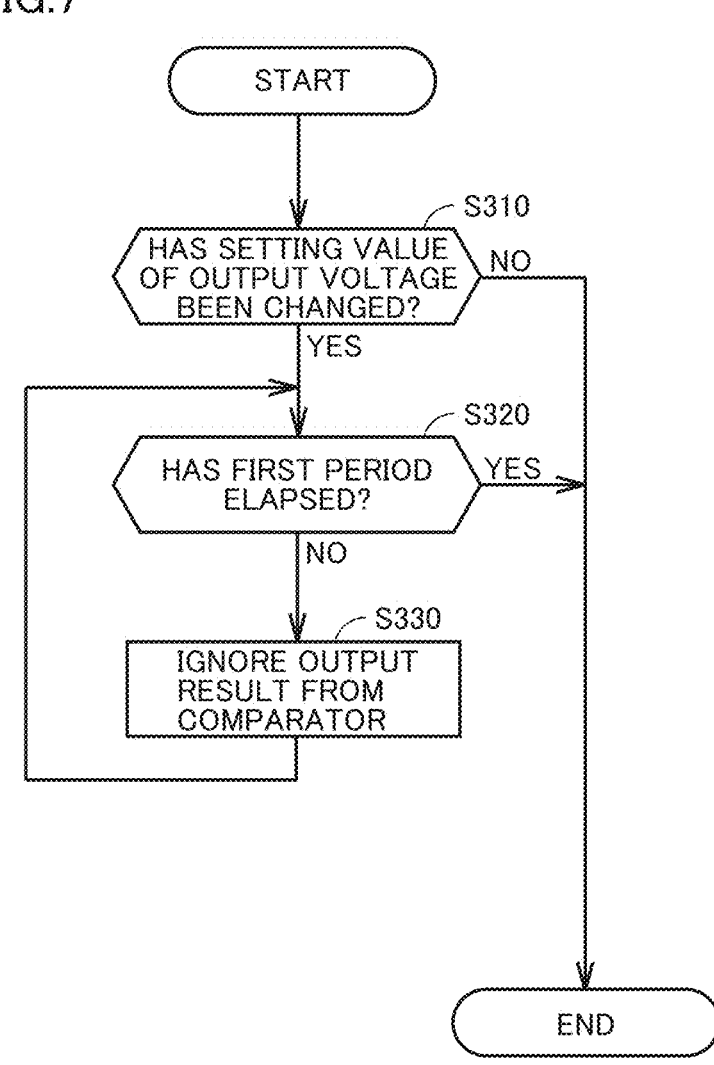
FIG. 7 is a flowchart at the time of change of an output voltage, which is executed by the control circuit in the second embodiment.

FIG. 7 is a flowchart at the time of change of the output voltage, which is executed by control circuit 400 in the second embodiment. Control circuit 400 in the second embodiment repeats execution of the flowchart in FIG. 7 in addition to FIG. 6 for the period during which high-voltage power supply unit 120 is driven. Control circuit 400 determines whether or not the setting value of the output voltage from high-voltage power supply unit 120 has been changed (step S310). For example, control circuit 400 receives from the outside, a signal indicating change of the setting value of the output voltage from high-voltage power supply unit 120.

When the setting value of the output voltage has not been changed (NO in step S310), control circuit 400 quits the process. When the setting value of the output voltage has been changed (YES in step S310), control circuit 400 determines whether or not a first period has elapsed since change of the setting value of the output voltage (step S320). When the first period has not elapsed (NO in step S320), control circuit 400 ignores output results from comparator Cmp1 and comparator Cmp2 (step S330). In other words, in step S330, even when a result of detection by comparator Cmp1 indicates detection of the current equal to or larger than the first threshold value or even when a result of detection by comparator Cmp2 indicates detection of the current equal to or larger than the second threshold value, control circuit 400 determines that electric discharge is not occurring.

Thereafter, control circuit 400 has the process return to step S320. Specifically, control circuit 400 keeps ignoring the output result from comparator Cmp2 until lapse of the first period since change of the setting value of the output voltage. In other words, even when comparator Cmp2 detects the current value equal to or larger than the second threshold value, control circuit 400 does not determine that electric discharge has occurred. The first period may be set, for example, to a value such as 10 ms, 100 ms, 1000 ms, or the like. The value of the first period is modified depending on contents of change of the setting value of the output voltage. When the first period has elapsed (YES in step S320), control circuit 400 quits the process. Thus, in X-ray fluorescence spectrometer 1000 in the second embodiment, erroneous detection of occurrence of electric discharge at the time of change of the setting value of the output voltage from high-voltage power supply unit 120 can be prevented. The flowchart at the time of change of the output voltage shown in FIG. 7 can naturally be applied also to the first embodiment including only a single comparator.

Modification

In the example in the first embodiment, control circuit 400 is described to notify the user of occurrence of abnormality such as electric discharge or short-circuiting after detection of flow of the current equal to or larger than the first threshold value. Control circuit 400, however, does not have to give notification to the user immediately after detection of flow of the current equal to or larger than the first threshold value. For example, control circuit 400 may notify the user of occurrence of abnormality such as electric discharge or short-circuiting based on occurrence of electric discharge a predetermined number of times within a predetermined period and encourage the user to perform maintenance of X-ray fluorescence spectrometer 1000. Thus, X-ray fluorescence spectrometer 1000 can give notification to the user at appropriate timing of occurrence of deterioration of X-ray tube 200, such as frequent occurrence of electric discharge. The predetermined period is set, for example, to one hour, and the predetermined number of times is set, for example, to fifty times.

In the example in the second embodiment, the configuration in which control circuit 400 determines in step S210 whether or not the current at the second threshold value has been detected and thereafter it determines in step S220 whether or not the current at the first threshold value has been detected is described. The order of detection of the current equal to or larger than the second threshold value and detection of the current equal to or larger than the first threshold value, however, may be opposite, and control circuit 400 may detect in parallel, the current equal to or larger than the second threshold value and detect the current equal to or larger than the first threshold value.

In the second embodiment, the example in which control circuit 400 receives from the outside, change of setting of an output voltage value and ignores the result of detection by comparator Cmp2 is described. Power supply apparatus 100, however, may further include a control board higher in order than control circuit 400, and the higher-order control board may determine whether or not to perform the electric discharge processing based on the result of detection by comparator Cmp2 inputted from control circuit 400. In this case, when the higher-order control board accepts change of setting of the output voltage from the user, it may ignore an instruction to perform the electric discharge processing from control circuit 400 for a certain period after change of setting.

Aspects

Illustrative embodiments described above are understood by a person skilled in the art as specific examples of aspects below.

Clause 1

An X-ray fluorescence spectrometer (1000) according to one aspect includes an X-ray tube (200) including a filament (F1) and a target (Tg1), the X-ray tube (200) irradiating a sample(S) with primary X-rays (10), a detector (300) that detects secondary X-rays (20) generated from the sample, a first power supply (120) that applies a tube voltage to the target, and a second power supply (110) that supplies a filament current to the filament. The first power supply includes a transformer (30) and a switching circuit (Mf1, Mf2) connected to a primary side of the transformer. The X-ray fluorescence spectrometer further includes a current detection circuit (600) connected to the primary side of the transformer to detect a current that flows to the primary side of the transformer and a control circuit (400) that controls the first power supply based on the current detected by the current detection circuit. The current detection circuit includes a first comparator configured to detect whether the current detected by the current detection circuit is equal to or larger than a first threshold value. The control circuit detects occurrence of electric discharge based on detection of the current equal to or larger than the first threshold value by the current detection circuit.

According to X-ray fluorescence spectrometer 1000 described in Clause 1, occurrence of electric discharge can accurately be detected.

(Clause 2) In the X-ray fluorescence spectrometer (1000) described in Clause 1, the current detection circuit (600A) further includes a second comparator (Cmp2) that detects whether the current detected by the current detection circuit is equal to or larger than a second threshold value smaller than the first threshold value.

According to X-ray fluorescence spectrometer 1000 described in Clause 2, control operation can be modified by using a plurality of threshold values.

(Clause 3) In the X-ray fluorescence spectrometer (1000) described in Clause 2, the control circuit stops operation of the first power supply when the current detected by the current detection circuit is equal to or larger than the second threshold value and equal to or larger than the first threshold value, and does not stop operation of the first power supply when the current detected by the current detection circuit is equal to or larger than the second threshold value and smaller than the first threshold value.

According to X-ray fluorescence spectrometer 1000 described in Clause 3, when electric discharge exceeding the first threshold value set for the purpose of prevention of break of a circuit is detected, application of a PWM signal can temporarily be stopped. When electric discharge to such an extent as exceeding the second threshold value smaller than the first threshold value is detected, on the other hand, only the electric discharge processing is performed. By thus setting the second threshold value to a value larger than a current value in normal operation and smaller than the first threshold value, electric discharge can more accurately be detected.

(Clause 4) In the X-ray fluorescence spectrometer (1000) described in Clause 3, the control circuit determines that the electric discharge is not occurring even when the current detected by the current detection circuit is equal to or larger than the second threshold value until lapse of a first period since acceptance of change of a setting value of an output voltage from the first power supply.

According to X-ray fluorescence spectrometer 1000 described in Clause 4, erroneous detection of occurrence of electric discharge with change of the setting value of the output voltage can be suppressed.

(Clause 5) In the X-ray fluorescence spectrometer (1000) described in any one of Clauses 1 to 4, when the control circuit determines that the electric discharge has occurred a predetermined number of times (for example, one hundred times) within a predetermined period (for example, one hour), the control circuit encourages a user to perform maintenance of the X-ray fluorescence spectrometer.

According to X-ray fluorescence spectrometer 1000 described in Clause 5, the user can be encouraged to perform maintenance of the X-ray fluorescence spectrometer in accordance with a frequency of electric discharge that occurs.

(Clause 6) In the X-ray fluorescence spectrometer (1000) described in Clause 1, the control circuit determines that the electric discharge is not occurring even when the current detected by the current detection circuit is equal to or larger than the first threshold value until lapse of a first period since acceptance of change of a setting value of an output voltage from the first power supply.

According to X-ray fluorescence spectrometer 1000 described in Clause 6, erroneous detection of occurrence of electric discharge with change of the setting value of the output voltage can be suppressed.

(Clause 7) A power supply apparatus (100) according to one aspect is a power supply apparatus (100) that supplies a current to an X-ray tube (200) including a filament (F1) and a target (Tg1), and the power supply apparatus includes a first power supply (120) that applies a tube voltage to the target and a second power supply (110) that supplies a filament current to the filament. The first power supply includes a transformer (30) and a switching circuit (Mf1, Mf2) connected to a primary side of the transformer. The power supply apparatus (100) further includes a current detection circuit (600) connected to the primary side of the transformer to detect a current that flows to the primary side of the transformer and a control circuit (400) that controls the first power supply based on the current detected by the current detection circuit. The current detection circuit includes a first comparator configured to detect whether the current detected by the current detection circuit is equal to or larger than a first threshold value. The control circuit detects occurrence of electric discharge based on detection of the current equal to or larger than the first threshold value by the current detection circuit.

According to power supply apparatus 100 described in Clause 7, occurrence of electric discharge can accurately be detected.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. An X-ray fluorescence spectrometer comprising:
an X-ray tube including a filament and a target, the X-ray tube irradiating a sample with primary X-rays;
a detector that detects secondary X-rays generated from the sample;
a first power supply that applies a tube voltage to the target;
a second power supply that supplies a filament current to the filament,
the first power supply including
a transformer, and
a switching circuit connected to a primary side of the transformer;
a current detection circuit connected to the primary side of the transformer to detect a current that flows to the primary side of the transformer; and
a control circuit that controls the first power supply based on the current detected by the current detection circuit, wherein
the current detection circuit includes a first comparator configured to detect whether the current detected by the current detection circuit is equal to or larger than a first threshold value, and
the control circuit detects occurrence of electric discharge based on detection of the current equal to or larger than the first threshold value by the current detection circuit.

2. The X-ray fluorescence spectrometer according to claim 1, wherein
the current detection circuit further includes a second comparator that detects whether the current detected by the current detection circuit is equal to or larger than a second threshold value smaller than the first threshold value.

3. The X-ray fluorescence spectrometer according to claim 2, wherein
the control circuit
stops operation of the first power supply when the current detected by the current detection circuit is equal to or larger than the second threshold value and equal to or larger than the first threshold value, and
does not stop operation of the first power supply when the current detected by the current detection circuit is equal to or larger than the second threshold value and smaller than the first threshold value.

4. The X-ray fluorescence spectrometer according to claim 3, wherein
the control circuit determines that the electric discharge is not occurring even when the current detected by the current detection circuit is equal to or larger than the second threshold value until lapse of a first period since acceptance of change of a setting value of an output voltage from the first power supply.

5. The X-ray fluorescence spectrometer according to claim 1, wherein when the control circuit determines that the electric discharge has occurred a predetermined number of times within a predetermined period, the control circuit encourages a user to perform maintenance of the X-ray fluorescence spectrometer.

6. The X-ray fluorescence spectrometer according to claim 1, wherein the control circuit determines that the electric discharge is not occurring even when the current detected by the current detection circuit is equal to or larger than the first threshold value until lapse of a first period since acceptance of change of a setting value of an output voltage from the first power supply.

7. A power supply apparatus that supplies a current to an X-ray tube including a filament and a target, the power supply apparatus comprising:

a first power supply that applies a tube voltage to the target;

a second power supply that supplies a filament current to the filament, the first power supply including a transformer, and a switching circuit connected to a primary side of the transformer;

a current detection circuit connected to the primary side of the transformer to detect a current that flows to the primary side of the transformer; and a control circuit that controls the first power supply based on the current detected by the current detection circuit, wherein the current detection circuit includes a first comparator configured to detect whether the current detected by the current detection circuit is equal to or larger than a first threshold value, and the control circuit detects occurrence of electric discharge based on detection of the current equal to or larger than the first threshold value by the current detection circuit.

* * * * *